H. O. SMITH.
FASTENER.
APPLICATION FILED OCT. 30, 1917.
1,273,100.
Patented July 16, 1918.
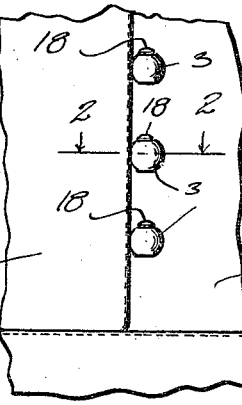
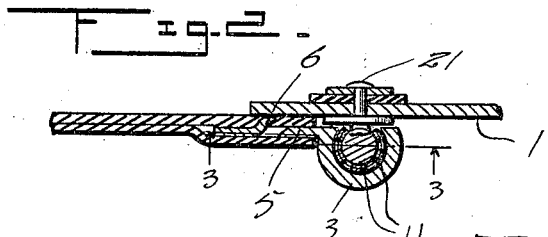
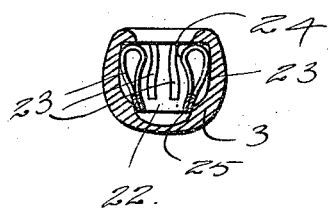
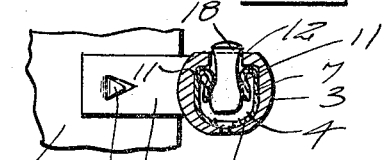
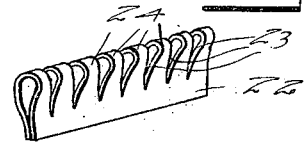
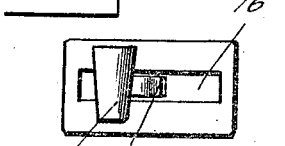
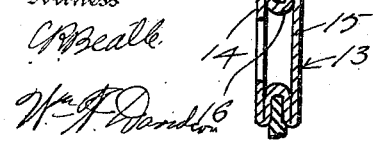
Witness
C. Beale
Wm. F. Dandin
Inventor
H. O. Smith
By
Attorney

UNITED STATES PATENT OFFICE.

HARRY O. SMITH, OF KANSAS CITY, MISSOURI.

FASTENER.

1,273,100.

Specification of Letters Patent.

Patented July 16, 1918.

Application filed October 30, 1917. Serial No. 199,340.

*To all whom it may concern:*

Be it known that I, HARRY O. SMITH, a citizen of the United States, residing at Kansas City, in the county of Jackson and State of Missouri, have invented certain new and useful Improvements in Fasteners; and I do hereby declare the following to be a full, clear, and exact description of the invention such as will enable others skilled in the art to which it appertains to make and use the same.

This invention relates to improvements in fasteners of the type set forth in my Patent #1,219,179 filed October 24, 1916, and has for one of its objects the provision of means whereby the male fastening element may be adjusted toward and from the female member upon the shoe upper or the like, so that the shoe upper may be made to fit ankles of several sizes.

Another object of this invention is the provision of a fastener of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts, as will be hereinafter more fully described and claimed.

For a complete understanding of my invention, reference is to be had to the following description and accompanying drawings, in which:—

Figure 1 is a fragmentary portion of the upper of a shoe embodying my improved fastener in a closed position as made in accordance with this invention, Fig. 2 is a sectional view taken on the line 2—2 of Fig. 1, Fig. 3 is a sectional view taken on the line 3—3 of Fig. 2 illustrating the means for securing the female element to the shoe upper, Fig. 4 is a plan view of a spring catch located within the female element, Fig. 5 is a plan view of the male element, Fig. 6 is a sectional view illustrating means for holding the male element in adjusted position, Fig. 7 is a fragmentary sectional view illustrating means of securing the housing or supporting bracket for the male member, Fig. 8 is a vertical sectional view of the female element illustrating a modified form of spring catch, and Fig. 9 is a perspective view of the catch before being bent to be inserted in the female element.

Referring in detail to the drawing, the numeral 1 indicates one section of an upper of a shoe, and 2 indicates the other section and to which section my improved fastener is applied.

The female member consists of a head 3 provided with a socket 4 that opens outwardly through the top wall and rear wall thereof. Formed upon the head 3 is an attaching plate that is adapted to be positioned between the layers of the section 2 of the shoe upper and has struck out therefrom a retaining tongue 6 that is adapted to bight into the section 2 and prevent the head 3 from becoming detached therefrom.

A clamp or catch 7 is located within the head 3 and consists of a plate 9 constructed from resilient material which is provided with a plurality of spaced slots 10. The plate 9 is bent back upon itself so as to form resilient tongues 11. The plate 9 is then bent in substantially U-shaped formation and positioned within the head as clearly illustrated in Fig. 3, having the resilient fingers 11 disposed inwardly after the plate 9 is bent into substantially U-shape formation. The clamp or catch 7 is retained within the head 3 by means of retaining flanges 12 that are formed on the rear wall thereof by the socket opening outwardly through the top and rear walls.

A housing or bracket 13 consists of front and rear plates that are connected by end walls 16. The end walls 16 are bent inwardly to define grooves which receive and grip the section 1 of the upper of the shoe. The front wall 14 is provided with an elongated slot 16' to slidably receive a shank 17 formed upon an elongated stud 18. The shank 17 has formed upon its inner end a retaining plate 19 that slides between the walls 14 and 15. The rear wall 15 has struck up therefrom a plurality of spaced tongues 20 for the purpose of holding the stud 18 in various adjusted positions within the housing or bracket 13. The stud 18 is concaved from one end in the direction of the other end and is adapted to be inserted within the head 3 of the female element by way of the open top wall permitting the shank 17 to extend through the rear wall thereof. As the stud 18 enters the socket 4, the spring fingers 11 will fit in the concaved portion thereof and retain the male member within the female member. When it is desired to cause the upper of the shoe to accommodate ankles of several sizes, the stud 18 of the male fastening element may be slid in relation to the bracket or housing 13 and held in adjusted position by means of the tongue 20 so that the upper of the shoe when the male and female members are connected will tightly fit the ankle. If desired, the shank 17 of the male member may be extended through the section 1 of the upper and headed as illustrated at 21 so that the male member is permanently secured to the section 1 of the upper of the shoe.

Referring to my modified form of spring catch as illustrated in Figs. 8 and 9, it consists of a plate 22 constructed of steel or other resilient material suitable for the purpose and is provided with a plurality of transverse slots 23 to form gripping members 24 when the plate is bent longitudinally upon itself as shown in Fig. 9.

The plate is bent from one end in the direction of the other end to make the same of substantially U-shape formation and is placed in the head or female element 3. The head or female element 3 is provided with shoulders 25 to which the plate is soldered or otherwise fastened to provide a construction that will readily grip the male element when inserted therein. The gripping members or portions 24 engage the concaved portions of the male element. The female element is further provided with a shoulder at its mouth to engage the plate and hold the same against accidental displacement.

While I have shown and described the preferred embodiment of my invention, it will be understood that minor changes in construction, combination and arrangement of parts may be made, without departing from the spirit and scope of the invention as claimed.

Having thus described my invention, what I claim is:

1. A fastener comprising male and female members, said female member consisting of a socketed head, a plate having a plurality of slots and bent upon itself and into U-shaped formation positioned within the socketed head to form resilient fingers adapted to engage and hold the male member within the head, and means adjustably connecting the male member to the upper of the shoe so that the same may be moved toward and from the female member to cause the upper of the shoe to accommodate ankles of several sizes.

2. A fastener comprising male and female members, means securing the female member to the upper of a shoe, a housing secured to the upper of the shoe and having an elongated slot therein, said male member consisting of a shank slidable in the slot, a stud formed on said shank and received by said head, and a plurality of spaced tongues struck from the rear wall of the housing to hold the shank in an adjusted position within the housing.

3. A fastening comprising a male and female member, said female member consisting of a socketed head which socket opens outwardly through the top and rear wall thereof, shoulders formed in the head, means securing the head to a shoe, a resilient plate provided with a plurality of transversely extending slots bent longitudinally upon itself and again bent in the direction of each end to form a substantially U-shaped catch positioned within the head and secured to one of the shoulders and abutting the other shoulder, and said slots forming gripping members adapted to engage the male element and hold the same within the female member.

In testimony whereof I affix my signature in presence of two witnesses.

HARRY O. SMITH.

Witnesses:
J. HERBERT SMITH,
FRANK SHEANS.

Copies of this patent may be obtained for five cents each, by addressing the "Commissioner of Patents, Washington, D. C."